United States Patent [19]

McCumber

[11] Patent Number: 5,749,010
[45] Date of Patent: May 5, 1998

[54] CAMERA SUPPORT

[75] Inventor: Michael T. McCumber, League City, Tex.

[73] Assignee: McCumber Enterprises, Inc., League City, Tex.

[21] Appl. No.: 837,502

[22] Filed: Apr. 18, 1997

[51] Int. Cl.⁶ .................................................. G03B 29/00
[52] U.S. Cl. ........................... 396/420; 396/428; 224/265
[58] Field of Search ........................... 396/419, 420–426, 396/428; 224/265, 266, 270, 908

[56] References Cited

U.S. PATENT DOCUMENTS

| | | | |
|---|---|---|---|
| 3,882,524 | 5/1975 | Rauscher | 396/420 |
| 4,526,308 | 7/1985 | Dovey | 224/265 |

Primary Examiner—Howard B. Blankenship
Attorney, Agent, or Firm—Wendy K. Buskop; Cynthia G. Seal; Chamberlain, Hrdlicka et al

[57] ABSTRACT

A camera support for holding a camera in front of a user having a first U-shaped section. The first U-shaped section is connected to a second U-shaped section which is in turn connected to an arm portion that has a camera mount. The first U-shaped section has a first end and a second end and is formed from a pair of generally straight leg portions and a generally arcuate connecting portion. The first U-shaped section is adapted to fit around the user's neck so that the legs rest on the user's chest. The second U-shaped section has a first end and a second end with the first end being rotatably connected to the second end of the first U-shaped section. The arm section has a first end and a second end, where the first end is pivotally connected to the second end of the second U-shaped section by a first pivot. The camera mount is pivotally connected to the second end of the arm section by a second pivot.

15 Claims, 5 Drawing Sheets

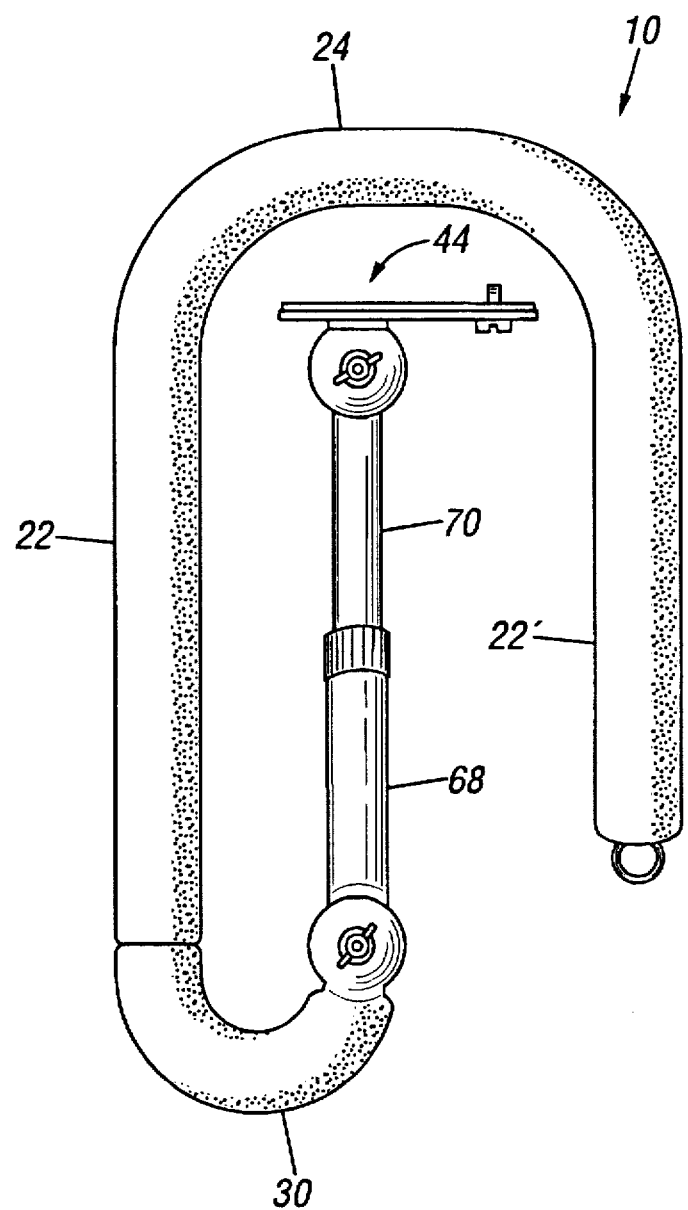

CAMERA SUPPORT

BACKGROUND

The present invention relates to an apparatus for holding a camera either video or still, ready for use against the body of a user.

When using a camera, particularly a video camera, which is heavy, for any length of time, difficulty is encountered in keeping the camera still while taking pictures. If the camera moves during the picture, the resulting images are not as sharp as they could be. The common solution for this is a ground support for the camera such as a tripod. This eliminates the need to hold the camera, but it limits the range of motion of the camera severely.

There are several devices available for holding a camera suspended in front of the user while being supported by a portion of the user's body. The available devices rest directly on at least one of the user's shoulders and some require the user to use at least one hand to steady the camera while taking pictures. A device that distributed the weight of the camera across the users chest instead of the shoulders and is completely hands free would be useful.

It is an object of the present invention to provide a camera support means that is supported by the user's neck and chest.

It is an object of the present invention to provide a camera support means that is lightweight and provides hands free stable operation.

It is a further object of the present invention to provide a camera support means that is easily stored while not in use.

SUMMARY

In the present invention, there is provided, a camera support means for holding a camera in front of a user having a first U-shaped section. The first U-shaped section is connected to a second U-shaped section which is in turn connected to an arm portion that has a camera support means mounted thereto. The first U-shaped section has a first end and a second end and is formed from a pair of generally straight leg portions and a generally arcuate connecting portion. The first U-shaped section is adapted to fit around the user's neck so that the legs rest on the user's chest. The second U-shaped section has a first end and a second end with the first end being rotatably connected to the second end of the first U-shaped section.

The arm section has a first end and a second end, where the first end is pivotally connected to the second end of the second U-shaped section by a first pivot means. The camera mounting means is pivotally connected to the second end of the arm section by a second pivot means. The first pivot means includes a locking means for locking the arm section in a pre-determined relationship with the second U-shaped section. The second pivot means also includes a locking means for locking the camera mounting means in a pre-determined relationship with the arm section.

In another embodiment of the present invention provides for a camera support means as described above where the first end of the arm section is pivotally connected to the second end of the second U-shaped section by a first pivot means and the pivot means is removably connected to the second end of the second U-shaped section. This design allows the user to remove the arm section and the camera mounting means from the second U-shaped section so the user can hold the arm section with one hand if desired.

BRIEF DESCRIPTION OF THE DRAWINGS

FIG. 6 is a front view of one embodiment of the invention.

DETAILED DESCRIPTION OF THE PREFERRED EMBODIMENTS

Figure 1:
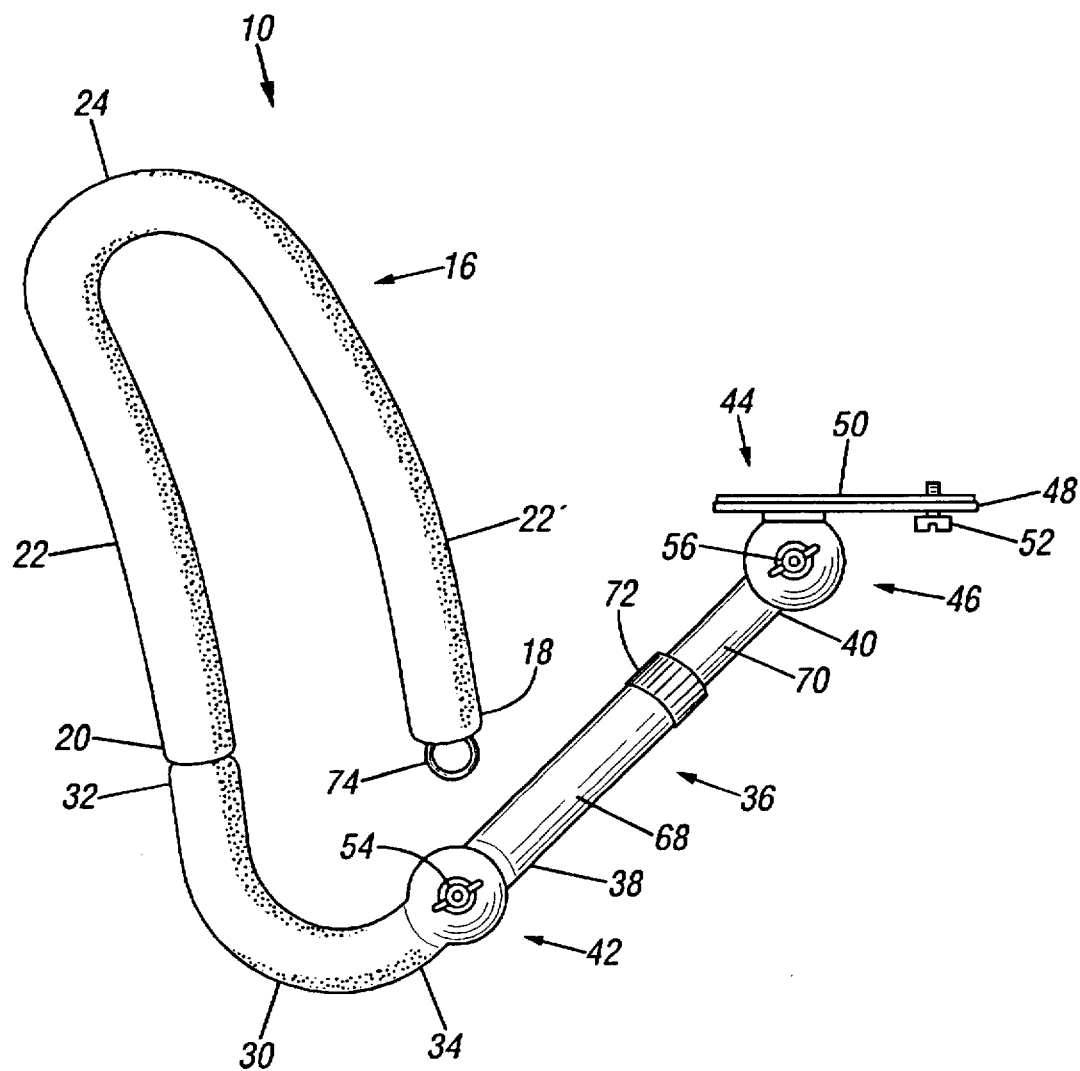
FIG. 1 is a perspective view of one embodiment of the present invention.
Figure 2:
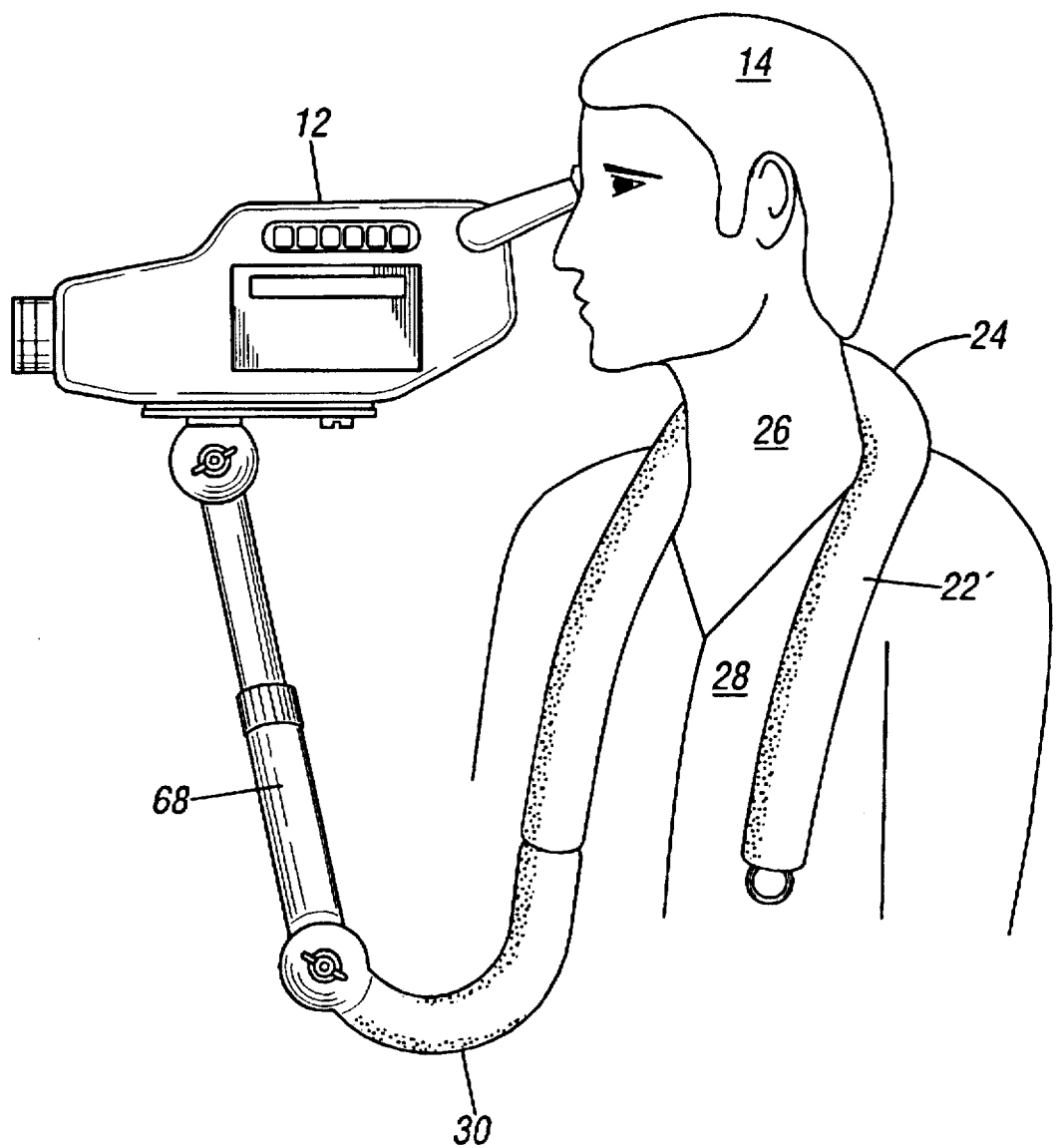
FIG. 2 is a left side view of one embodiment of the present invention.
Figure 3:
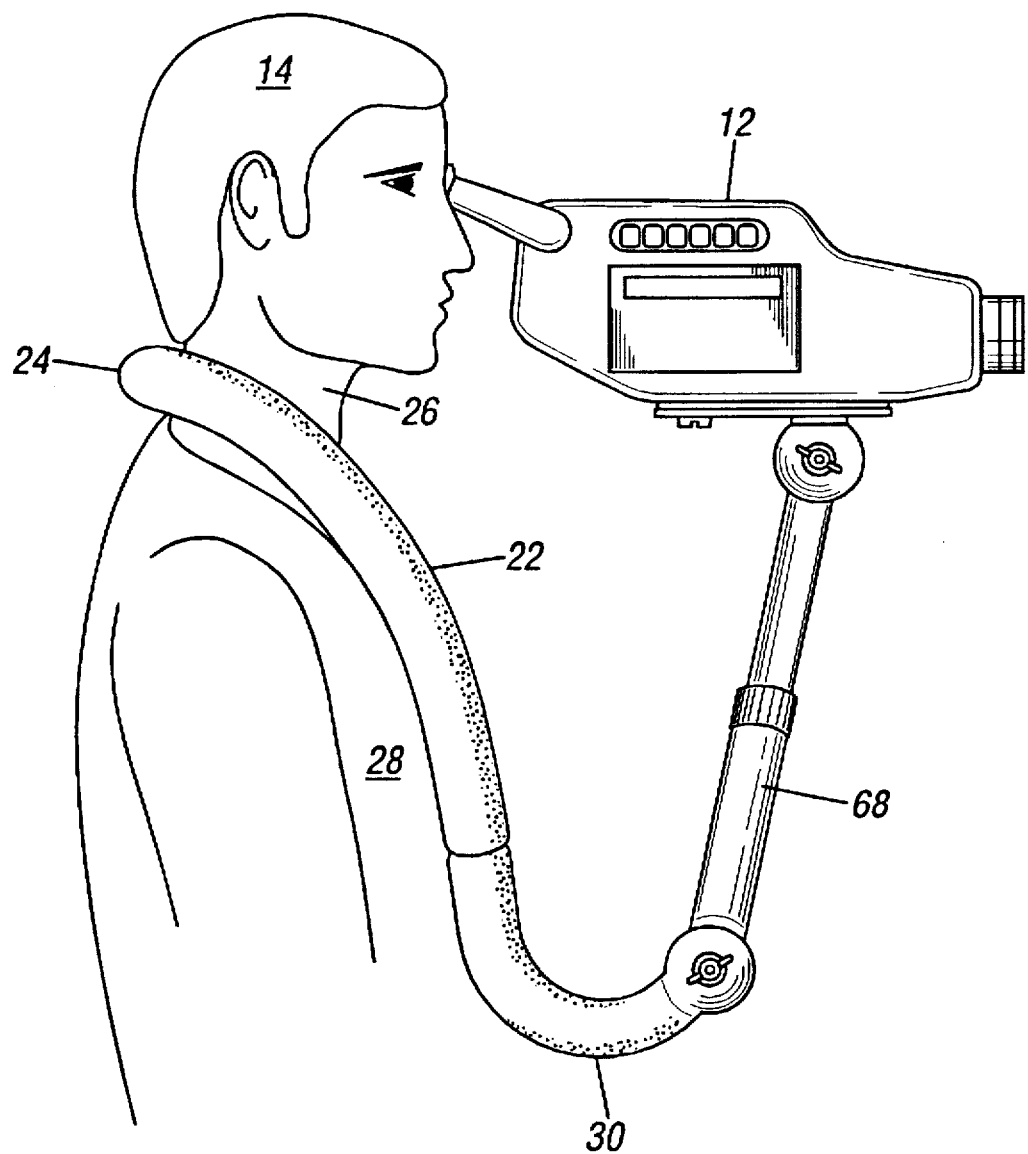
FIG. 3 is a right side view of one embodiment of the present invention.

As shown in FIGS. 1–3 there is provided, a camera support means 10 for holding a camera 12 in front of a user 14. The camera support means 10 has a first U-shaped section 16 having a first end 18 and a second end 20 and is formed from a pair of generally straight leg portions 22 and a generally arcuate connecting portion 24. The first U-shaped section 16 is adapted to fit around the user's neck 26 so that the legs 22 rest on said user's chest 28. There is a second U-shaped section 30 having a first end 32 and a second end 34 with the first end 32 being rotatably connected to the second end 20 of the first U-shaped section 16. There is an arm section 36 having a first end 38 and a second end 40, where the first end 38 is pivotally connected to the second end 34 of the second U-shaped section 30 by a first pivot means 42. There is also a camera mounting means 44 pivotally connected to the second end of the arm section 36 by a second pivot means 46. The camera mounting means 44 can be a plate that has a layer of rubber on the top and a thumb screw extending therethrough to secure the camera to the plate. The first pivot means 42 includes a locking means 54 for locking the arm section 36 in a pre-determined relationship with the second U-shaped section 30. The second pivot means 46 includes a locking means 56 for locking the camera mounting means 44 in a pre-determined relationship with the arm section 36.

The first U-shaped portion is curved backward away from the user's head so as to follow the curve from the back of a user's neck 26 down to the chest 28 as shown in FIGS. 2 and 3. The generally straight leg portions rest against the chest 28 to support the entire unit so that little weight or pressure is put on the neck 26. This configuration provides greater stability for the camera so that the user 14 need not hold or steady the camera to take pictures or film with a video camera.

The rotatable connection between the first U-shaped section 16 and the second U-shaped section 30 can be achieved by welding a nut to the second end of the first U-shaped section 16 and a cap screw to the first end of the second U-shaped portion so that the two sections can rotate. The second U-shaped section 30 rotates out, away from the first U-shaped section 16, until it is in a plane normal to the longitudinal axis of the second end 20 of the first U-shaped section 16 and stops. Likewise the second U-shaped section 30 rotates in, towards the first U-shaped section 16, until it is in a plane parallel with the first U-shaped section 16 and stops.

Figure 4:
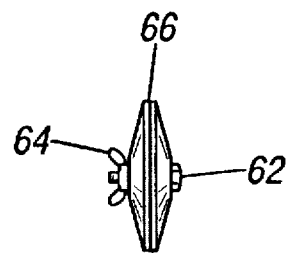
FIG. 4 is a side view of a locking means.

The first and second pivot means 42, 46 can include a pair of swivel plates 60 adjustably connected with the locking means comprising a screw 62 and wing nut 64 combination as shown in FIG. 4. A piece of rubber 66 can be positioned in between the two swivel plates that creates the necessary friction to allow the user to tighten the wing nut 64 and lock the arm section 36 or camera mounting means 44 in the desired position. To adjust the position, the wing nut 64 is loosened and the arm section 36 or camera mounting means 44 is moved to the desired position, then the wing nut 64 is tightened to hold the arm section 36 or camera mounting means 44 in place.

In the alternative, instead of a piece of rubber between the swivel plates, a pair of opposing mesh teeth can be used. This type of gear uses two plates with teeth that are oriented in opposite directions to one another. The user tightens and loosens the gear in the same way as the swivel plate to engage the teeth. This type of gear will last longer than the rubber piece in between the two plates, because eventually the rubber will wear out. This type of gear could also be made from plastic.

Preferably, the arm section 36 comprises a first tube 68 extending from the first end 38 and a second tube 70 extending from the second end, wherein one of the tubes is slidably and telescopically received by the other tube so that the arm section 36 is of adjustable length. As shown in FIG. 1 the second tube 70 is received by the first tube 68 and can be extended or retracted. In this embodiment, the second tube 70 can be held in place by a conventional compression nut 72 that is twisted to lock or release the second tube 70. Having one tube that is slidably and telescopically received by the other, allows the arm section 36 to be extended to at least 13 inches. This is very useful for a user 14 that has a very long torso and may need to adjust the arm upwards so that the camera will meet the user's eye level. A commercially available telescoping tube can be used for the arm section 36.

In a preferred embodiment, the second end of the first U-shaped section 16 has a longitudinal axis, and the second U-shaped section 30 rotates in a plane normal to the longitudinal axis of the second end of the first U-shaped section 16. The second end of the second U-shaped section 30 also has a longitudinal axis, and the arm section 36 rotates in a plane parallel to the longitudinal axis of the second end of the second U-shaped section 30. This feature allows the user 14 to position the camera close to their eye. Depending on the size of the user 14, comfortable positions for the camera 12 in relation to the user's eye may vary. The arm section 36 has a longitudinal axis and the camera support means 10 rotates in a plane normal to the longitudinal axis of the arm section 36. This allows the user 14 to adjust the camera to different angles depending on the location of subject being photographed or filmed. For instance, if the subject is on the floor and the user 14 chooses to stand up straight to film or photograph the subject, the user 14 can adjust the camera downward toward the floor. This means that the user 14 does not have to bend over for instance to follow a crawling baby all over the floor.

The first end of the first U-shaped section 16 can have an eyelet means 74 connected thereto. This eyelet means 74 can be used to attach an adjustable strap that can go around the users back, over the second U-shaped section 30 and reattach at the eyelet for added support.

In use, as shown in FIG. 7 the second U-shaped section 30 is rotatable to a first position where the arm section 36, the camera support means 10, and the second U-shaped section 30 are positionable in between the first end and the second end of the first U-shaped section 16 and in generally the same plane as the first U-shaped section 16. This position is useful for storing the device. When in this first position, the whole camera support means 10 takes up very little space and can be stored in a suitcase or closet very easily.

As shown in FIGS. 1-3, the second U-shaped section 30 is rotatable to a second position wherein the arm section 36, the camera support means 10 and the second U-shaped section 30 are positionable generally in a plane normal to the first U-shaped section 16. This is essentially the working position. The arm is extended in front of the user 14 and the second U-shaped section 30 stops at a position normal to the first U-shaped section 16. The second U-shaped section 30 is held in this second position by the weight of the camera.

Preferably, the first U-shaped section 16, the second U-shaped section 30 and the arm section 36 are made of a tubular material such as stainless steel, plastic, or metal composite material. Ideally, the tubular material is ⅜" stainless steel tubing because it is lightweight and sturdy. The camera support means 10 can be covered with a foam or rubberlike material or any other material that is cushiony. A foam material will make the camera support means 10 more comfortable for the user 14.

In a preferred embodiment, each of the pair of generally straight legs is from between about 8 and about 12 inches in length, the generally arcuate connecting portion is from between about 10 and about 16 inches in length, and the second U-shaped section 30 is between about 3 and about 5 inches in length. The first tube 68 of the arm section 36 is between about 4 and about 8 inches in length and the second tube 70 is between about 4 and about 8 inches in length. Preferably, each of the pair of generally straight legs is about 10 inches in length, the arcuate connecting portion is about 13 inches in length, and the second U-shaped section 30 is about 4 inches in length. The first tube 68 of the arm section 36 is preferably about 6 inches in length and the second tube 70 is about 5 ½ inches in length. Each of the pair of generally straight legs does not have to be equal in length. The generally straight leg 22 that is attached to the second U-shaped section can be shorter than the other generally straight 22' leg.

In another embodiment of the present invention, there is provided, a camera support means 10 for holding a camera 12 in front of a user 14 having a first U-shaped section 16, a second U-shaped section 30, an arm section 36 and a camera support means 10 as described above. The first U-shaped section 16 has a first end and a second end and formed from a pair of generally straight leg portions and a generally arcuate connecting portion, the first U-shaped section 16 is shaped to fit around the user's neck 26 so that the legs rest on the user's chest 28. The first U-shaped portion is curved back so as to follow the curve from the back of a user's neck 26 down to the chest 28. The generally straight leg portions rest against the chest 28 to support the entire unit so that little weight or pressure is put on the neck 26. The arm section 36 has a first end and a second end, where the first end is pivotally connected to the second end of the second U-shaped section 30 by a first pivot means 42 and the pivot means is removably connected to the second end of the second U-shaped section 30. This allows the user 14 to remove the arm section 36 from the second U-shaped portion and hold the camera 12 to his face with his hand.

Figure 5:
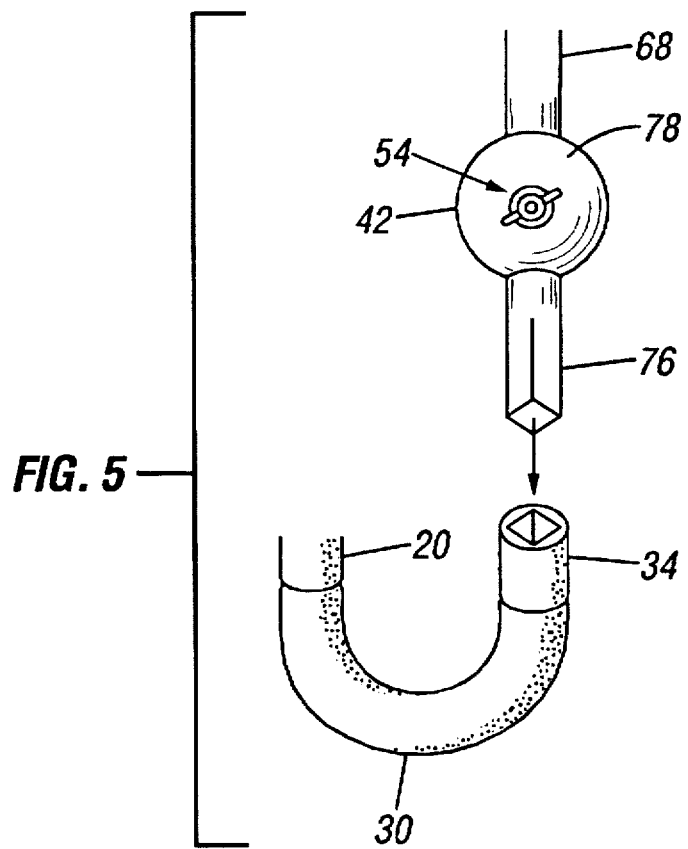
FIG. 5 is a perspective view of another embodiment of the present invention.

Preferably, the first pivot means 42 has a first end 76 and a second end 78. The second end 34 of the second U-shaped section 30 forms a hole sized to receive the first end 76 of the first pivot means 42, and the second end 78 of the first pivot means 42 is pivotally attached to the arm portion as shown in FIG. 5.

Although the present invention is described and illustrated above with detailed reference to the preferred embodiment, the invention is not limited to the details of such embodiment but is capable of numerous modifications, by one of ordinary skill in the art, within the scope of the following claims.

I claim:

1. A camera support means for holding a camera in front of a user comprising:
   a first U-shaped section having a first end and a second end and formed from a pair of generally straight leg portions and a generally arcuate connecting portion, said first U-shaped section being adapted to fit around said user's neck so that the legs rest on said user's chest;
   a second U-shaped section having a first end and a second end with the first end being rotatably connected to the second end of the first U-shaped section;
   an arm section having a first end and a second end, where the first end is pivotally connected to the second end of said second U-shaped section by a first pivot means,
   a camera mounting means pivotally connected to the second end of the arm section by a second pivot means;
   said first pivot means including a locking means for locking the arm section in a pre-determined relationship with the second U-shaped section; and
   said second pivot means including a locking means for locking the camera mounting means in a pre-determined relationship with the arm section.

2. A camera support means as in claim 1, wherein said arm section comprises a first tube extending from the first end and a second tube extending from the second end, wherein one of said tubes is slidably and telescopically received by the other tube so that the arm section is of adjustable length.

3. A camera support means as in claim 1, wherein the second end of the first U-shaped section has a longitudinal axis, and said second U-shaped section rotates in a plane normal to the longitudinal axis of the second end of said first U-shaped section.

4. A camera support means as in claim 1, wherein said second end of said second U-shaped section has a longitudinal axis, and said arm section rotates in a plane parallel to the longitudinal axis of the second end of the second U-shaped section.

5. A camera support means as in claim 2, wherein said arm section has a longitudinal axis and said camera support means rotates in a plane normal to the longitudinal axis of the arm section.

6. A camera support means as in claim 2, wherein the first end of the first U-shaped section has a eyelet means connected thereto.

7. A camera support means as in claim 1, wherein the second U-shaped section is rotatable to a first position wherein the arm section, the camera support means, and the second U-shaped section are positionable in between the first end and the second end of the first U-shaped section and in generally the same plane as the first U-shaped section.

8. A camera support means as in claim 1, wherein the second U-shaped section is rotatable to a second position wherein the arm section, the camera support means and the second U-shaped section are positionable generally in a plane normal to the first U-shaped section.

9. A camera support means as in claim 1, wherein the first U-shaped section, the second U-shaped section and the arm section are made of a tubular material selected from the group consisting of: stainless steel, plastic, and metal composite material.

10. A camera support means as in claim 1, wherein each of the pair of generally straight legs are from between about 8 and about 12 inches in length, the generally arcuate connecting portion is from between about 10 and about 16 inches in length, and the second U-shaped section is between about 3 and about 5 inches in length.

11. A camera support means as in claim 2, wherein the first tube of the arm section is between about 4 and about 8 inches in length and the second tube is between about 4 and about 8 inches in length.

12. A camera support means as in claim 2, wherein each of the pair of generally straight legs is about 10 inches in length, the arcuate connecting portion is about 13 inches in length, and the second U-shaped section is about 4 inches in length.

13. A camera support means as in claim 2, wherein the first tube of the arm section is about 6 inches in length and the second tube is about 5½ inches in length.

14. A camera support means for holding a camera in front of a user comprising:
   a first U-shaped section having a first end and a second end and formed from a pair of generally straight leg portions and a generally arcuate connecting portion, said first U-shaped section being shaped to fit around said user's neck so that the legs rest on said user's chest;
   a second U-shaped section having a first end and a second end with the first end being rotatably connected to the second end of the first U-shaped section;
   an arm section having a first end and a second end, where the first end is pivotally connected to the second end of said second U-shaped section by a first pivot means and said pivot means is removably connected to said second end of said second U-shaped section,
   a camera mounting means pivotally connected to the second end of the arm section by a second pivot means;
   said first pivot means including a locking means for locking the arm section in a pre-determined relationship with the second U-shaped section; and
   said second pivot means including a locking means for locking the camera mounting means in a pre-determined relationship with the arm section.

15. A camera support means as in claim 14, wherein said first pivot means has a first end and a second end, said second end of said second U-shaped section forms a hole sized to receive said first end of said first pivot means, and said second end of said first pivot means is pivotally attached to said arm portion.

* * * * *